C. G. OLSON.
MILLING CUTTER.
APPLICATION FILED OCT. 20, 1920.

1,425,893.

Patented Aug. 15, 1922.
2 SHEETS—SHEET 1.

Inventor:
Carl G. Olson
By Cheever & Cox
Attys

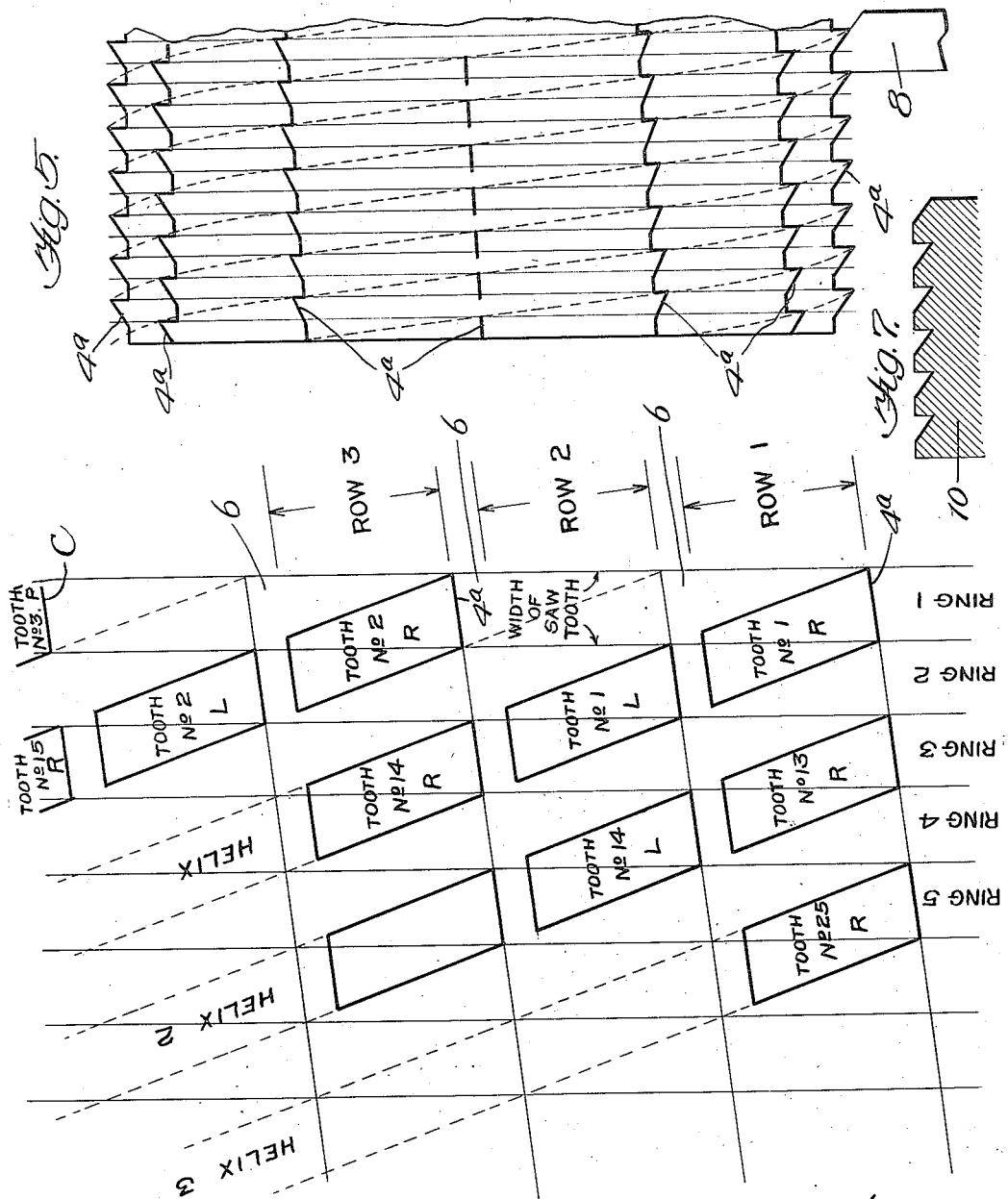

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

MILLING CUTTER.

1,425,893.   Specification of Letters Patent.   Patented Aug. 15, 1922.

Application filed October 20, 1920. Serial No. 418,143.

*To all whom it may concern:*

Be it known that I, CARL G. OLSON, a citizen of the United States, residing at Chicago, in the county of Cook and State of Illinois, have invented a certain new and useful Improvement in Milling Cutters, of which the following is a specification.

My invention relates to milling cutters and is particularly useful in the manufacture of hack saws. Heretofore it has been common practice to employ ordinary ring milling cutters, in which the teeth are arranged annularly or in rings arranged at right angles to the axis of the cutter. Usually these cutters are shorter than the length of the saw and hence have to be re-positioned a number of times. This is disadvantageous because it is difficult to reposition the cutter accurately and the result is that the saw teeth are very apt to be imperfect. Sometimes a number of these cutters are placed end to end on a mandrel and thus produce a composite or sectional cutter of the same length as the saw; but it is difficult to make cutters exactly alike and to accurately position them on the mandrel and the saw teeth are just as apt to be imperfect as when a single cutter is used. The ultimate object of my invention is to facilitate the production of perfect hack saws and to render it practicable as a manufacturing proposition to produce perfect saws without requiring great skill and care on the part of the operator. Viewed in another aspect, the object of the invention is to make it possible to produce one piece "ring" milling cutters of any desired length by the use of a single turning tool of shorter length than the cutter without the need of repositioning the tool in the sense of shifting it manually in a direction parallel to the axis of the cutter. In carrying out my invention I produce milling cutters in which the cutting faces of the teeth occur in rings, but they also occur in helices with the result that they may be generated by a turning tool traveling axially relatively to the cutter. In such case the cut which the turning tool takes continues from one end of the cutter to the other, thus making it possible to produce a cutter of any desired length and with teeth which are all of exactly the same height. It has been common practice in cutting hack saws to cut first one side of a tooth and then the other, for example, first taking a cut on the acting side of the saw tooth and then on the relief side,—alternately this method producing better teeth in the saw. My cutter is adapted to operate in this manner. To briefly describe the method of producing my cutter: I take a single or multiple nosed turning tool and mount it in a relieving machine of the type ordinarily employed in the production of gear cutting hobs. I also mount in the work holder of the machine a gashed blank of any desired length, usually the full length of the hack saw or other work to be produced. Relieving machines are well known and hence need not be here described. In adjusting the machine I gear the lead screw in such manner that the tools will produce multiple threads or "starts" in the blank. One reason for this is to obtain helical cuts which will have a steep lead or large helix angle. This makes it easier to bring the successive teeth in the finished cutter into successive rings. Twelve teeth to the inch is a common pitch in hack saws and usually in such cases, especially as it is desirable to cut first one side of the saw tooth and then the other, I would ordinarily employ a blank having 12 gashes and six threads or starts. When the machine is properly geared and the work and turning tool mounted therein I start the machine, which causes the blank to rotate about its axis and the tool to travel in an axial direction, that is, parallel to the axis of the blank. I feed the tool radially inward toward the blank to take the proper depth of cut, after which the action will be automatic in the sense that the cut will continue from one end of the blank to the other, the tool being automatically moved radially inward and outward to produce the relief in the cutter teeth in the manner well known to those familiar with the manufacture of hobs and milling cutters. Usually it is necessary to take a number of cuts to reach the requisite depth, but after the blank has been cut to the proper depth along one helix I index the work by rotating it about its axis through the proper angle while the tool stands still. The cutting operation will then be repeated and a second helix be produced. This operation is repeated for every helix to be cut. In other words, the work will be angularly advanced or "indexed" as many times as there are threads or "starts" to be produced in my finished cutter. It will thus be seen that in taking each cut the turning tool travels from one end of the cutter blank to the other with the result that the cut is uniform from one end to the other. I would point out also that while a manual adjustment is necessary for each new cut or start, this adjustment does not consist as heretofore in shifting the tool lengthwise of the axis of the work (which on account of backlash and for other reasons requires great skill and care if the operation is to be done at all accurately). The adjustment consists of indexing the work, that is, rotating it through the proper angle. Relieving and screw cutting machines are commonly provided with indexing heads so that the act of indexing can be performed easily and accurately. The result is that a cutter embodying my invention may be readily made accurately regardless of its length and of the number of threads or helices which it may have. Furthermore, by my method the number of adjustments required may be smaller than would be the case if an attempt were made to make an ordinary ring milling cutter of equal length by the use of an ordinary turning tool. For example, no matter how long the cutter blank, a saw having twelve teeth to the inch may be produced by a milling cutter having but six threads or starts, and in such case the work need be indexed but six times.

While my cutter is not necessarily limited to the production of hack saws, it is nevertheless well adapted for such purpose and I have chosen to illustrate the invention as applied to the manufacture of hack saws. In the form selected:

Figure 5 is a diagrammatic view showing the profile of the cutter teeth and showing the generating tool in acting position.

Figure 6 is a diagrammatic view on an enlarged scale and with the helical lead exaggerated, the purpose being to bring out more clearly the principle underlying the arrangement and form of the teeth.

Figure 7 is a profile sectional view of a multiple nose turning tool for producing a plurality of cutter teeth at a time.

Like numerals denote like parts throughout the several views.

Figure 1:
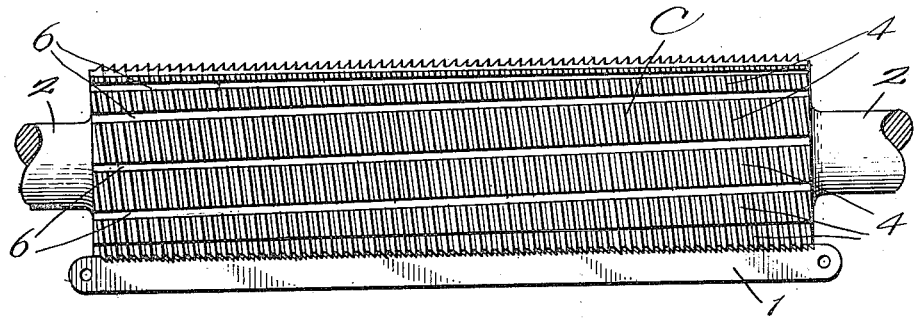
Figure 1 is a face view of a cutter embodying the invention, the cutter being shown in the act of producing a hack saw.
Figure 2:
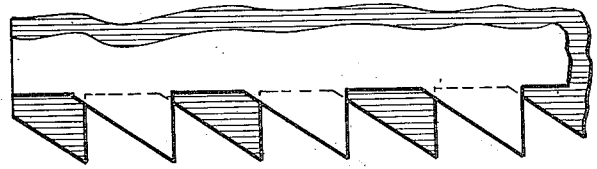
Figure 2 is a fragmentary diagrammatic view illustrating the alternate manner in which the teeth of the cutter cut the teeth in the blank. In other words this is a profile view showing teeth on opposite sides of a given gash and illustrating the staggered relation of such teeth.
Figure 3:
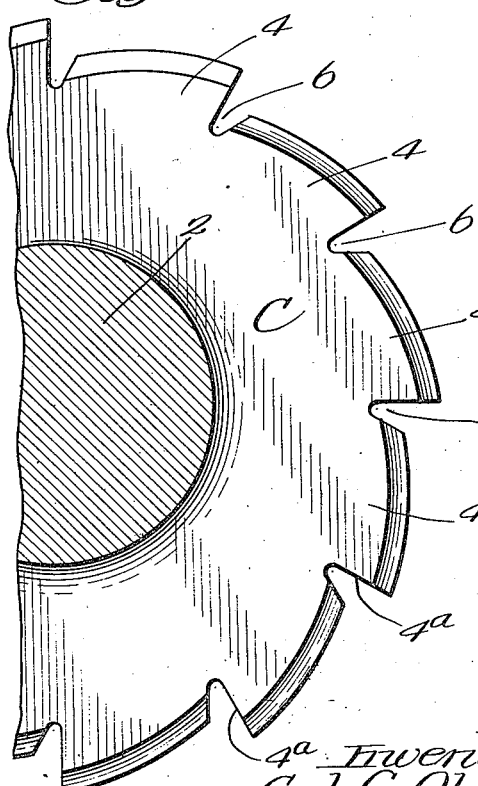
Figure 3 is an end view of my improved cutter showing the relief and other characteristics of the cutting teeth.

Referring to the drawings, 1 represents a saw blank and C indicates the cutter in general. The cutter is preferably integral with arbors 2 at the ends whereby it is supported and rotated. The teeth 4 of the cutter are relieved in the usual manner and separated by gashes 6 as usual. The cutting faces $4^a$ have a profile illustrated by the turning tool 8 indicated in Figure 5. The turning tool 8 shown in Figure 5 constitutes a single tool while the form 10 shown in Figure 7 constitutes a multiple tool—that is, one capable of cutting a plurality of teeth simultaneously.

The teeth of my cutter are arranged both annularly and helically, that is to say, the cutting edges $4^a$ are arranged in series one behind the other in rings the planes whereof are perpendicular to the axis of the cutter; but the body of each tooth conforms to a helix after the manner of an ordinary hob and the pitch of the helix is such that in any given helix the successive cutting faces will occur in different rings.

Figure 4:
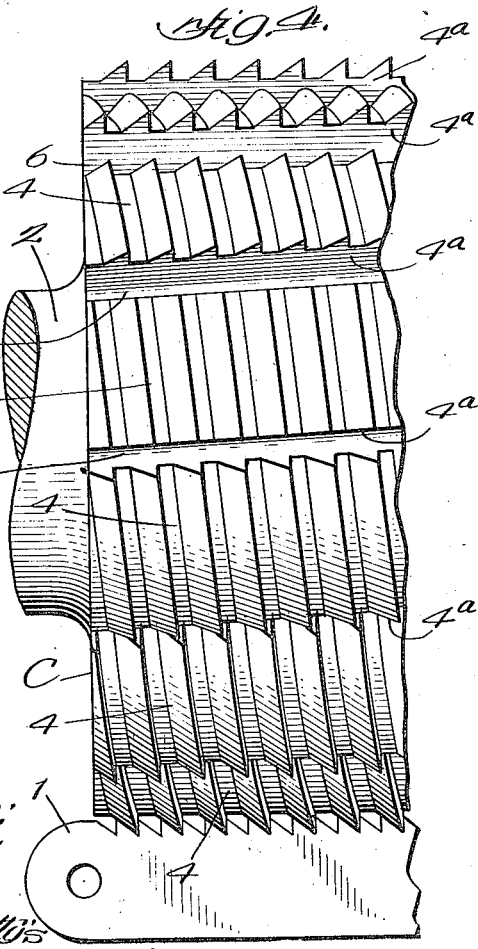
Figure 4 is a face view of a portion of the cutter, this view being on a larger scale to more clearly illustrate the form and arrangement of the teeth.

Referring to Figure 6 the rings are numbered ring 1, ring 2, et. seq. and the rows of teeth between gashes are numbered row 1, row 2, et. seq. The helices are also numbered helix 1, helix 2, et. seq. For identification I have numbered some of the teeth as No. 1, No. 2, No. 3, et. seq. As the cutter is designed to cut first one side and then the other side of a tooth, I have marked the cutter teeth R to indicate teeth which will cut the right side of a saw tooth and L to indicate those which will cut the left side of the same saw tooth. It will be noted by inspecting the diagram that the cutting edges of teeth No. $1^R$ No. $2^R$ and No. $3^R$ occur in ring No. 1, but they do not occur in the same helix. On the contrary, helix No. 1 contains tooth No. $1^R$, tooth No. $1^L$ and tooth No. $14^R$, et. seq. As previously stated hack saws are frequently made 12 pitch. Accordingly the cutter here illustrated has twelve teeth in a circumference, but as each helix contains both "right" and "left" cutting teeth, the number of helices or threads is only six and hence the cutter blank need be indexed but five times after the first setting. It will be understood that the shaded parallelograms in Figure 6 represent the full width of a cutter tooth, not only of the projecting portion but of all that appertains to that tooth; e. g., in a cutter for producing hack saws of twelve pitch the axial dimension of the shaded rectangle will represent one twelfth of an inch. The actual construction will appear approximately as shown in Figures 4 and 5.

In use my cutter is arranged with its axis parallel with the acting edges of a stack of blanks and is fed vertically down the stack, that is, in a direction parallel to the height of the stack and perpendicular to the plane of the individual blanks. The axis of the cutter moves parallel to itself and ordinarily completes the cutting of the entire stack of blanks during a single pass or downward movement.

It might be thought that as the cutter has no axial travel when cutting the saw blanks, and as the bodies of the teeth are helical, the cutter would remove too much metal from the saw blanks, thus leaving no teeth at all or simply vestiges of teeth. This is not a fact, however, the reason being that the cutter teeth are relieved, that is, they drop down eccentrically back of the cutting face and hence there is no metal in the hob which will interfere with the saw teeth or prevent the perfect forming thereof.

From the foregoing it will be seen that a cutter embodying my invention may be produced by a single or multiple cutting tool which is fed axially relatively to the cutter; nevertheless when the cutter is set to rotating it will produce saw teeth, for the cutting edges are arranged one directly behind the other in the same ring or plane perpendicular to the axis.

Having thus described my invention what I claim as new and desire to secure by Letters Patent is:

1. A milling cutter having the cutting faces of its teeth arranged both helically and in rings perpendicular to the axis of the cutter.

2. A milling cutter having teeth the cutting faces whereof occur in rings parallel to the plane of rotation, and also in helices, and the body of the teeth being helical, whereby the cutter teeth may be generated by a turning tool traveling axially relatively to the cutter; and the cutter teeth being relieved for non-interference with the work.

3. A cutter for producing hack saws, the cutter having a plurality of rings of teeth corresponding to the pitch of the teeth in the saw to be cut, the teeth of the cutter being also arranged and formed helically, as in an ordinary hob, and the pitch of the helix being such as to bring succeeding teeth in the helix into another ring on the cutter.

4. A cutter for producing hack saws, the cutter having a plurality of rings of teeth, and a plurality of rows of teeth separated by gashes, the teeth being also arranged and formed helically, as in an ordinary hob, and the pitch of the helix being such as to bring each succeeding tooth in the helix in the next adjacent ring.

5. A cutter having helically arranged and helically formed teeth, the composite projection of the teeth on a reference plane parallel to the axis presenting a complete outline of the work, and the projection of the teeth along any given row being incomplete in that every other tooth is omitted.

6. A ring milling cutter having its teeth occurring in helices as well as rings and the helices being plural in number whereby the lead or helix angle is great enough to bring the successive teeth in any given helix into successive rings.

7. A ring milling cutter having its teeth occurring in helices as well as rings and the helices being plural in number whereby the lead or helix angle is great enough to bring the successive teeth in any given helix into successive rings and any given pair of teeth succeeding each other in any given helix occurring in adjacent rings and being adapted to cut opposite sides of the same tooth in the work.

8. A ring milling cutter having its teeth occurring in helices as well as rings, and having the following arrangement and relative numbers and the actual numbers recited, viz.; six helices; twelve teeth in a complete circumference in any given helix; six teeth in a complete circumference in any given ring; and twelve gashes.

9. A ring milling cutter having its teeth occurring in helices as well as rings, and having the following arrangement and relative numbers and the actual numbers recited, viz.; six helices; twelve teeth in a complete circumference in any given helix; six teeth in a complete circumference in any given ring; and twelve gashes; the profiles of any two adjacent teeth facing the same gash being separated by a space cut to the root circle of the cutter and the distance between the points of the cutter being at a distance apart equal to the pitch of the teeth to be cut in the work.

10. A ring milling cutter having its teeth arranged in helices as well as rings, the cutter having a plurality of gashes and half as many helices as gashes.

In witness whereof, I have hereunto subscribed my name.

CARL G. OLSON.